United States Patent
Shouji

(10) Patent No.: US 12,460,590 B2
(45) Date of Patent: Nov. 4, 2025

(54) CONTROLLER FOR INTERNAL COMBUSTION ENGINE

(71) Applicant: TOYOTA JIDOSHA KABUSHIKI KAISHA, Toyota (JP)

(72) Inventor: Junpei Shouji, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/925,030

(22) Filed: Oct. 24, 2024

(65) Prior Publication Data

US 2025/0172098 A1 May 29, 2025

(30) Foreign Application Priority Data

Nov. 29, 2023 (JP) ................. 2023-201730

(51) Int. Cl.
F02D 23/00 (2006.01)
F01M 13/00 (2006.01)
F01M 13/02 (2006.01)
F02B 33/40 (2006.01)

(52) U.S. Cl.
CPC ......... F02D 23/00 (2013.01); F01M 13/0011 (2013.01); F01M 13/028 (2013.01); F02B 33/40 (2013.01); F01M 2250/60 (2013.01); F02D 2200/021 (2013.01); F02D 2200/0406 (2013.01)

(58) Field of Classification Search
CPC ............... F02D 23/00; F01M 13/0011; F01M 13/02–028; F02B 33/34–33/40; F02B 39/10; F02B 37/10; F02B 37/12
See application file for complete search history.

(56) References Cited

U.S. PATENT DOCUMENTS

2015/0240732 A1* 8/2015 Makihara ............. F01M 13/028
123/563
2019/0162139 A1* 5/2019 Ito ....................... F02D 41/0065

FOREIGN PATENT DOCUMENTS

JP 2008064059 A 3/2008
JP 2014092070 A 5/2014

* cited by examiner

Primary Examiner — Loren C Edwards

(57) ABSTRACT

A controller is configured to control an internal combustion engine. The internal combustion engine includes an intake passage, a motor, a forced-induction device, a flow rate adjusting valve, a crankcase, and first and second passages connected to the crankcase. The forced-induction device uses the motor to drive a compressor wheel provided in the intake passage. The flow rate adjusting valve is provided downstream of the compressor wheel in the intake passage. The controller includes processing circuitry configured to execute scavenging control that drives the motor with the flow rate adjusting valve closed in a case where engine shutdown is performed.

5 Claims, 3 Drawing Sheets

CONTROLLER FOR INTERNAL COMBUSTION ENGINE

BACKGROUND

1. Field

The present disclosure relates to a controller for an internal combustion engine.

2. Description of Related Art

For example, Japanese Laid-Open Patent Publication No. 2014-92070 discloses an internal combustion engine that includes a flow rate adjusting valve provided in the intake passage, a first passage that fluidly connects the crankcase to a section of the intake passage at the upstream side of the flow rate adjusting valve, and a second passage that fluidly connects the crankcase to a section of the intake passage at the downstream side of the flow rate adjusting valve. By utilizing the pressure within the intake passage generated during engine operation, blow-by gas within the crankcase is drawn into the intake passage for scavenging, thereby performing blow-by gas treatment.

When the internal combustion engine is repeatedly stopped and started before the warm-up of the internal combustion engine is completed, the temperature in the crankcase does not increase. Thus, condensed water originating from the moisture contained in the blow-by gas is more likely to form inside the crankcase. When condensed water forms in the crankcase, it may mix and accumulate in the lubricating oil stored in the oil pan. Accordingly, it is desirable to scavenge the interior of the crankcase even while the internal combustion engine is not running. However, in conventional configurations that utilize the pressure inside the intake passage generated during engine operation, it is challenging to scavenge the interior of the crankcase when the internal combustion engine is not running.

SUMMARY

This Summary is provided to introduce a selection of concepts in a simplified form that are further described below in the Detailed Description. This Summary is not intended to identify key characteristics or essential characteristics of the claimed subject matter, nor is it intended to be used as an aid in determining the scope of the claimed subject matter.

An aspect of the present disclosure provides a controller for an internal combustion engine. The internal combustion engine includes an intake passage, a compressor wheel provided in the intake passage, a motor, a forced-induction device that drives the compressor wheel using the motor, a flow rate adjusting valve provided downstream of the compressor wheel in the intake passage, a crankcase, a first passage that fluidly connects the crankcase to the intake passage between the compressor wheel and the flow rate adjusting valve, and a second passage that fluidly connects the crankcase to a section of the intake passage on a downstream side of the flow rate adjusting valve. The controller includes processing circuitry configured to execute scavenging control that drives the motor with the flow rate adjusting valve closed in a case where engine shutdown is performed.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A controller for an internal combustion engine mounted on a vehicle according to an embodiment will now be described.

Configuration of Internal Combustion Engine and Drive System

Figure 1:
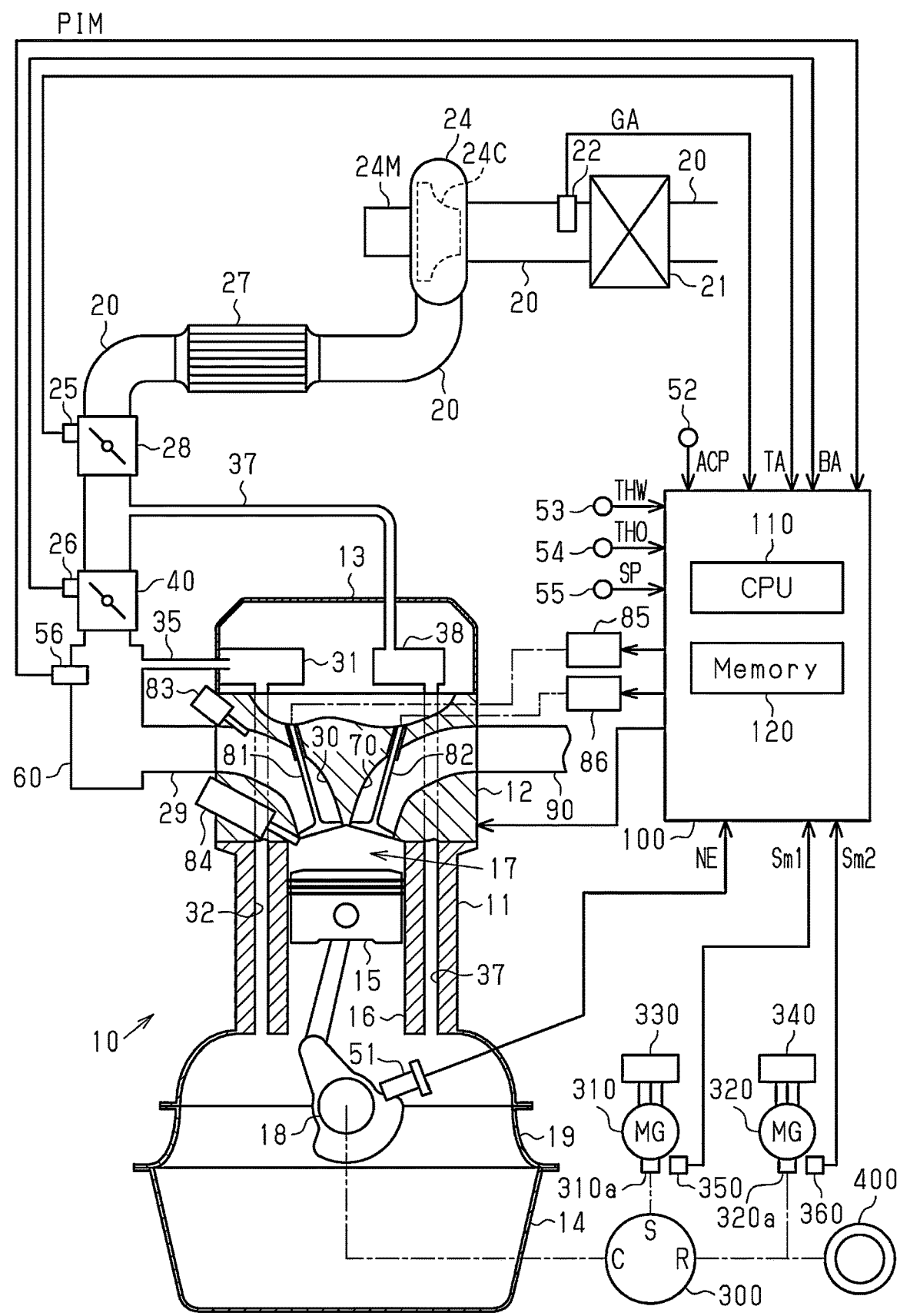
FIG. 1 is a schematic diagram showing the configuration of an internal combustion engine and a driving system according to an embodiment.

As shown in FIG. 1, the internal combustion engine 10 includes a cylinder block 11, a cylinder head 12, a head cover 13, and an oil pan 14. The cylinder block 11 includes a cylinder 16 in which a piston 15 is disposed to reciprocate.

The cylinder head 12 includes an intake port 30 that draws intake air into a combustion chamber 17 of the internal combustion engine 10 and an exhaust port 70 that discharges exhaust gas from the combustion chamber 17.

The intake port 30 includes an intake valve 81 that selectively opens and closes the intake port 30. The intake valve 81 operates to selectively open and close in synchronization with the rotation of the crankshaft 18, which is an output shaft of the internal combustion engine 10. The drive system of the intake valve 81 includes an intake-side variable valve timing mechanism 85 that is a variable valve actuation mechanism that changes valve timing (opening/closing timing) of the intake valve 81.

The exhaust port 70 includes an exhaust valve 82 that selectively opens and closes the exhaust port 70. The exhaust valve 82 operates to selectively open and close in synchronization with the rotation of the crankshaft 18. The drive system of the exhaust valve 82 includes an exhaust-side variable valve timing mechanism 86, which is a variable valve actuation mechanism that changes valve timing (opening/closing timing) of the exhaust valve 82.

The cylinder head 12 also includes a port injection valve 83 that injects hydrogen gas as engine fuel into the intake port 30, a direct injection valve 84 that directly injects hydrogen gas as engine fuel into the combustion chamber 17, and an ignition plug (not shown).

A crankcase 19 is provided below the cylinder block 11. The crankcase 19 accommodates a crankshaft 18, which is an output shaft of the internal combustion engine 10. The oil pan 14, which stores lubricant, is provided below the crankcase 19.

An intake manifold 29 including a surge tank 60 is connected to the upstream side of the intake port 30. An intake pipe 20 is connected to the upstream side of the surge tank 60. The intake pipe 20, the surge tank 60, and the intake manifold 29 form an intake passage of the internal combustion engine 10.

The intake pipe 20 sequentially includes an air cleaner 21, a compressor wheel 24C of the forced-induction device 24, an intercooler 27, a throttle valve 28, and a flow rate adjusting valve 40 in order from the upstream end.

The air cleaner 21 filters intake air taken into the intake pipe 20.

The forced-induction device 24 boosts the air in the intake pipe 20. The compressor wheel 24C is rotated by an electric motor 24M.

The intercooler 27 cools the air that has passed through the compressor wheel 24C.

The throttle valve 28 adjusts the intake air amount of the internal combustion engine 10. The opening degree of the valve is modified by rotating a butterfly valve through an electric motor.

The flow rate adjusting valve 40 adjusts the flow rate of blow-by gas drawn from the crankcase 19 into the intake passage. The valve opening degree is modified by the electric motor. The flow rate adjusting valve 40 of the present embodiment has the same valve structure as the throttle valve 28 and may have a different valve structure.

An exhaust passage 90 is connected to the downstream side of the exhaust port 70.

The internal combustion engine 10 includes a blow-by gas treatment device, which treats gas (blow-by gas) leaking from the combustion chamber 17 into the crankcase 19 during a compression stroke and/or a combustion stroke.

The blow-by gas treatment device includes a fresh air drawing passage 37 that draws intake fresh air into the crankcase 19 for scavenging. One end of the fresh air drawing passage 37 is connected to the intake pipe 20 between the throttle valve 28 and the flow rate adjusting valve 40. The fresh air drawing passage 37 extends through the head cover 13, traverses the interior of the cylinder head 12 and the cylinder block 11, and is connected to the crankcase 19. A separator 38, which is an oil separator disposed within the head cover 13, is provided in the fresh air drawing passage 37. The fresh air drawing passage 37 and the separator 38 form a first passage that fluidly connects the intake passage between the compressor wheel 24C and the flow rate adjusting valve 40 to the crankcase 19.

The blow-by gas treatment device includes a suction passage 32 that is configured to conduct the blow-by gas in the crankcase 19 to the separator 31, which is an oil separator installed in the head cover 13. The end of the suction passage 32 connected to the separator 31 opens in the crankcase 19. The separator 31 may be located in the suction passage 32.

The separator 31 is connected to the surge tank 60 through a PCV passage 35. The suction passage 32, the separator 31, and the PCV passage 35 form a second passage that fluidly connects the crankcase 19 to a section of the intake passage on a downstream side of the flow rate adjusting valve 40.

Fresh air is drawn into the crankcase 19 through the fresh air drawing passage 37. In addition, when the opening degree of the flow rate adjusting valve 40 is adjusted to be smaller, the pressure on the downstream side of the flow rate adjusting valve 40 in the intake pipe 20 decreases. When the pressure downstream of the flow rate adjusting valve 40 decreases, the blow-by gas in the crankcase 19 is drawn into the intake pipe 20 through the suction passage 32 along with fresh air. The blow-by gas drawn into the intake pipe 20 is delivered to the combustion chamber 17 together with the intake air and burned therein.

The crankshaft 18 is mechanically coupled to a carrier C of a planetary gear mechanism 300, which is included in a power split device. The planetary gear mechanism 300 includes a sun gear S, which is mechanically coupled to a rotary shaft 310a of the first motor generator 310. The planetary gear mechanism 300 includes a ring gear R, which is mechanically coupled to a rotary shaft 320a of the second motor generator 320 and to driven wheels 400. Alternating-current voltage of an inverter 330 is applied to terminals of the first motor generator 310. Also, alternating-current voltage of an inverter 340 is applied to terminals of the second motor generator 320. Thus, the vehicle of the present embodiment is a hybrid system vehicle including the internal combustion engine 10 and a motor generator as prime movers.

The controller 100 is configured to control the internal combustion engine 10. The controller 100 operates various operational target devices, including the throttle valve 28, flow rate adjusting valve 40, port injection valve 83, direct injection valve 84, ignition plug, intake-side variable valve timing mechanism 85, exhaust-side variable valve timing mechanism 86, and the motor 24M of the forced-induction device 24. Additionally, the controller 100 operates the inverter 330 to control the first motor generator 310. Additionally, the controller 100 operates the inverter 340 to control the second motor generator 320.

The controller 100 includes circuitry such as a CPU 110 that performs a calculation process and a memory 120 that stores control programs and data. The controller 100 executes various types of control operations by causing the CPU 110 to execute programs stored in the memory 120. Although not illustrated, the controller 100 include multiple control units, including a control unit for the internal combustion engine, a control unit for the first motor generator 310, and a control unit for the second motor generator 320.

The controller 100 receives detection signals from various types of sensors. For example, the controller 100 receives detection signals from the air flow meter 22, which detects the intake air amount GA, and from the throttle sensor 25, which detects a throttle opening degree TA (opening degree of the throttle valve 28). Also, the controller 100 receives a detection signal from a valve opening degree sensor 26, which detects a valve opening degree BA (opening degree of the flow rate adjusting valve 40). Further, the controller 100 also receives a detection signal from a crank angle sensor 51, which detects the rotation angle (crank angle) of the crankshaft 18, to calculate an engine rotation speed NE. Furthermore, the controller 100 receives a detection signal from the accelerator operation sensor 52, which detects an accelerator operation amount ACP corresponding to the operation amount of the accelerator pedal. In addition, the controller 100 receives detection signals from a water temperature sensor 53, which detects a coolant temperature THW (coolant in the internal combustion engine 10), and from an oil temperature sensor 54, which detects an oil temperature THO (temperature of lubricant in the internal combustion engine 10). Additionally, the controller 100 receives a detection signal from a vehicle speed sensor 55, which detects a vehicle speed SP of a vehicle including the internal combustion engine 10. Further, the controller 100 receives a detection signal from the intake pressure sensor 56, which detects the intake pressure PIM (pressure in the surge tank 60). Furthermore, the controller 100 receives an output signal Sm1 of a first rotation angle sensor 350, which detects the rotation angle of the first motor generator 310. Moreover, the controller 100 receives an output signal Sm2 of a second rotation angle sensor 360, which detects the rotation angle of the second motor generator 320.

The controller 100 calculates an engine load factor KL based on the engine rotation speed NE and the intake air amount GA. The engine load factor KL is a parameter that defines the amount of air filling the combustion chamber 17 and is the ratio of the inflow air amount per combustion cycle in one cylinder to a reference inflow air amount. The reference inflow air amount is varied in correspondence with the engine rotation speed NE.

The controller 100 calculates a requested torque necessary for the vehicle's traveling based on the accelerator operation amount ACP and the vehicle speed SP. The controller 100 controls a requested output Pe of the internal combustion engine 10 and output torques of the first motor generator 310 and the second motor generator 320 to satisfy the requested torque of the vehicle. For example, when the requested output Pe of the internal combustion engine 10 is 0, the operation of the internal combustion engine 10 is stopped to perform EV driving using the output torque of the second motor generator 320.

Hydrogen gas, which serves as the engine fuel, has a wider range of combustible air-fuel mixtures compared to gasoline and can burn even with a relatively lean air-fuel mixture. Accordingly, the controller 100 performs the following output control for the internal combustion engine 10.

Specifically, the controller 100 executes control to cause the air-fuel ratio of the air-fuel mixture to be lower when the requested output Pe is relatively high than when the requested output Pe is relatively low. More specifically, the controller 100 basically maintains the throttle valve 28 at an opening degree greater than or equal to a specified value, for example, at an opening degree relatively close to the fully opened state. A requested injection amount Qd is set such that the requested injection amount Qd increases as the requested output Pe becomes larger. The requested injection amount Qd is a target value of the fuel injected from the port injection valve 83 and the direct injection valve 84. Then, the controller 100 controls the port injection valve 83 and the direct injection valve 84 such that the requested injection amount Qd is obtained. In the manner described as above, in the internal combustion engine 10, basically, the output adjustment is performed by changing the air-fuel ratio of the air-fuel mixture through adjustment of the fuel injection amount.

The controller 100 calculates the target valve timing for the intake valve 81 and/or the exhaust valve 82 based on parameters indicating the engine operating state, such as the engine rotation speed NE and the engine load factor KL. The controller 100 controls the intake-side variable valve timing mechanism 85 and/or the exhaust-side variable valve timing mechanism 86 based on parameters related to the control of target valve timing or the like.

Additionally, in a case where the engine shutdown is performed, the controller 100 calculates the target valve timing of the intake valve 81 and/or the exhaust valve 82 such that valve overlap occurs, in which part of the opening period of the intake valve 81 overlaps part of the opening period of the exhaust valve 82. Then, in a case where the engine shutdown is performed, the controller 100 controls the intake-side variable valve timing mechanism 85 and/or the exhaust-side variable valve timing mechanism 86 to cause the valve overlap.

Further, the controller 100 calculates a target boost pressure PTCp based on parameters indicating the engine operating states, such as the engine rotation speed NE and the engine load factor KL. Based on the parameters related to the control of the target boost pressure PTCp or the like, the driving of the motor 24M is controlled to adjust the boost pressure of the forced-induction device 24.

Scavenging Control

Since the engine fuel of the internal combustion engine 10 is hydrogen gas, which is gaseous fuel, the proportion of hydrogen molecules in the fuel is higher compared to liquid fuels such as gasoline. Therefore, the amount of moisture the contained in blow-by gas becomes greater than that in the liquid fuel. When the internal combustion engine 10 is repeatedly stopped and started before the warm-up of the internal combustion engine 10 is completed, the temperature in the crankcase 19 does not increase. Thus, condensed water originating from the moisture contained in the blow-by gas is more likely to form inside the crankcase 19. When condensed water forms in the crankcase 19, it may mix and accumulate in the lubricating oil stored in the oil pan 14.

Figure 2:
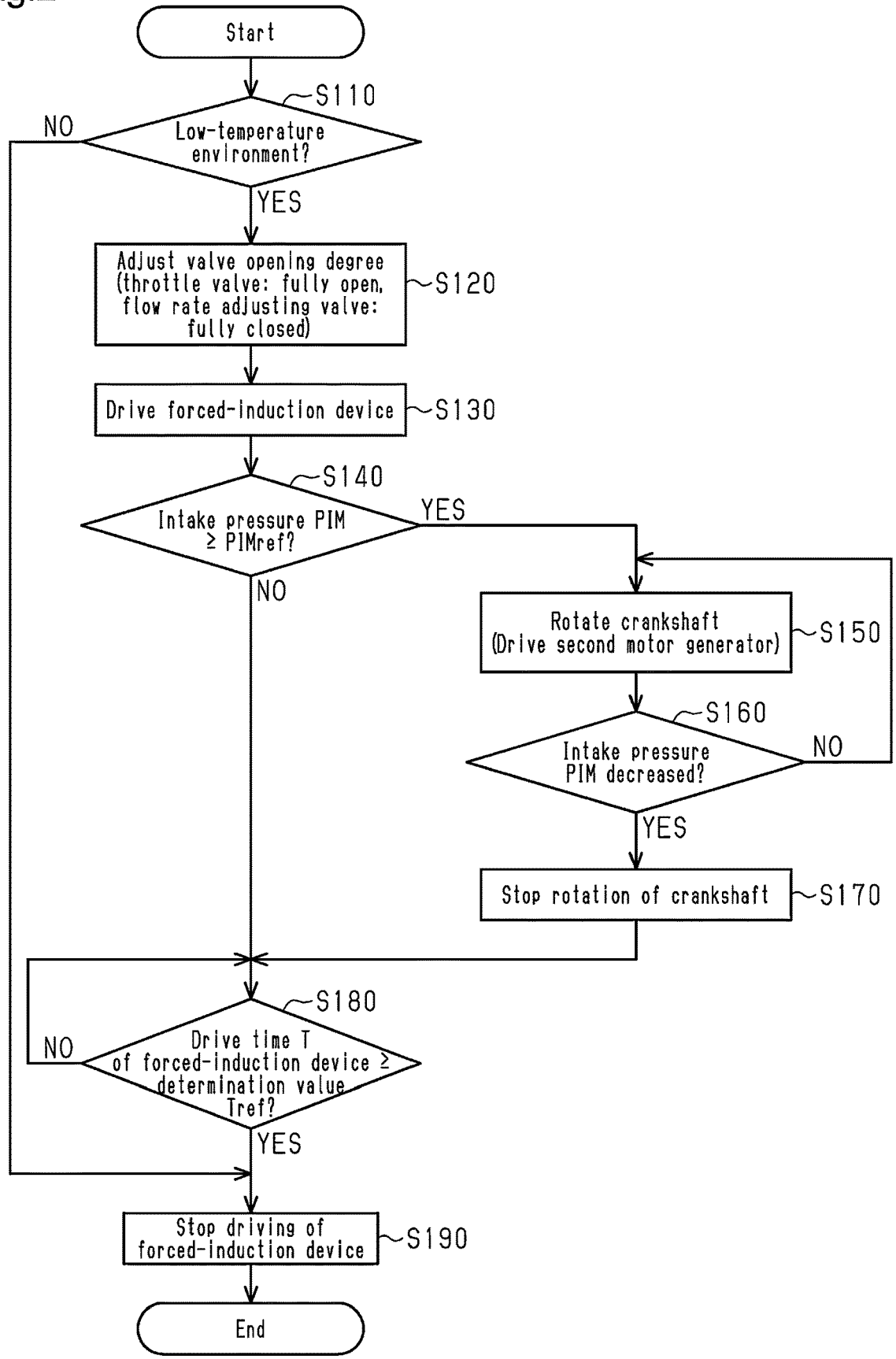
FIG. 2 is a flowchart showing a procedure of processes executed by the controller according to the embodiment.

To solve this problem, the controller 100 executes the process shown in FIG. 2 such that the interior of the crankcase 19 can be scavenged not only when the internal combustion engine 10 is running but also while it is not running FIG. 2 shows a procedure of processes executed by the controller 100. The processes illustrated in FIG. 2 are implemented by the CPU 110 executing the program stored in the memory 120 of the controller 100. The processes shown in FIG. 2 start when the controller 100 determines that the internal combustion engine 10 has stopped operating. In the following description, the number of each step is represented by the letter S followed by a numeral.

In the series of processes shown in FIG. 2, the controller 100 determines whether the internal combustion engine 10 is in a low-temperature environment (S110). During the process at step S110, the controller 100 determines that the internal combustion engine 10 is in a low-temperature environment when the temperature of the internal combustion engine 10 in a case where engine shutdown is performed is less than or equal to a specified threshold value. The values indicating the temperature of the internal combustion engine 10 can include, for example, the coolant temperature THW and the oil temperature THO. Further, the temperature of the internal combustion engine 10 may be estimated based on parameters such as the operating time of the internal combustion engine 10 before shutdown.

In the process of S110, when determining that the internal combustion engine 10 is in a low-temperature environment (S110: YES), the controller 100 adjusts the valve opening degree (S120). In the process of S120, the controller 100 adjusts the opening degree of the throttle valve 28 to a fully-open state and also adjusts the opening degree of the flow rate adjusting valve 40 to a fully-closed state.

Next, the controller 100 drives the forced-induction device 24 by rotating the motor 24M (S130). In a case where the internal combustion engine 10 is shutdown, scavenging control is executed to drive the motor 24M of the forced-induction device 24 with the flow rate adjusting valve 40 closed through execution of the processes of S120 and S130.

Subsequently, the controller 100 acquires the intake manifold pressure PIM detected during the execution of scavenging control and determines whether the acquired intake manifold pressure PIM is greater than or equal to a specified determination value PIMref (S140). The determination value PIMref is a predetermined minimum value of the intake manifold pressure PIM measured when the aforementioned valve overlap does not occur during the execution of scavenging control.

In the process of step S140, when determining that the intake pressure PIM is greater than or equal to the determination value PIMref (S140: YES), the controller 100 initiates motoring control to drive the first motor generator 310, causing the crankshaft 18 to rotate (S150).

After executing the process of step S150, the controller 100 determines whether the intake manifold pressure PIM has decreased (S160). During the process of S160, the controller 100 acquires the intake pressure PIM. Then, when the intake manifold pressure PIM obtained in the process of S160 has decreased by an amount corresponding to the specified value or more relative to the intake manifold pressure PIM obtained in the process of S140, the controller 100 determines that the intake manifold pressure (PIM) has decreased.

The controller 100 repeatedly executes the process of S150 and S160 until it is determined that the intake pressure PIM has decreased in the process of S160.

When determining in the process of S160 that the intake pressure PIM has decreased (S160: YES), the controller 100 stops the driving of the first motor generator 310 and stops the rotation of the crankshaft 18, thereby terminating the motoring control (S170).

When making a negative determination in the process of S140, or upon completion of the process of S170, the controller 100 executes the process of S180.

In the process of S180, the controller 100 determines whether a drive time T of the forced-induction device 24 is greater than or equal to a specified determination value Tref. The drive time T is the time elapsed from the initiation of driving of the forced-induction device 24 in the above-mentioned process S130, and is measured by the controller 100. The determination value Tref is a predetermined minimum drive time of the forced-induction device 24 required to perform scavenging inside the crankcase 19.

Then, in the process of S180, until the drive time T is determined to be greater than or equal to the determination value Tref, the controller 100 repeatedly executes the process of S180.

In the process of step S180, when determining that the drive time T is greater than or equal to the determination value Tref (S180: YES), the controller 100 stops the driving of the forced-induction device 24 by halting the rotation of the motor 24M (S190). Then, the controller 100 terminates this process.

Operation and Advantage of Present Embodiment (1) When the engine is stopped, scavenging control is executed to drive the motor 24M of the forced-induction device 24 with the flow rate adjusting valve 40 closed. When the motor 24M of the forced-induction device 24 is driven, fresh air flows into the crankcase 19 through the first passage. The fresh air that has flowed into the crankcase 19, together with the blow-by gas in the crankcase 19, flows into the intake passage through the second passage, thereby scavenging the interior of the crankcase 19. This allows for scavenging of the interior of the crankcase 19 even while the internal combustion engine 10 is not running.

(2) When the intake valve 81 and the exhaust valve 82 are both opened during execution of scavenging control, i.e., during valve overlap, the blow-by gas that has entered the intake passage flows out into the exhaust passage 90 of the internal combustion engine 10. Thus, the scavenging within the crankcase 19 is promoted. When valve overlap does not occur, the fresh air and blow-by gas that have entered the intake passage do not flow out into the exhaust passage 90. As a result, the intake pressure at locations downstream of the flow rate adjusting valve 40 increases. In the present embodiment, when the intake pressure PIM detected during the execution of scavenge control is greater than or equal to the determination value PIMref and it can be determined that valve overlap has not occurred, the controller 100 executes motoring control, which rotates the crankshaft 18 of the internal combustion engine 10. When the crankshaft 18 rotates, the intake valve 81 and/or the exhaust valve 82 are driven, resulting in valve overlap. This allows for scavenging of the interior of the crankcase 19 in a more favorable manner.

(3) When the temperature of the internal combustion engine 10 in a case where the engine shutdown is performed is less than or equal to the specified threshold value and it is determined that the internal combustion engine 10 is in a low-temperature environment (S110 in FIG. 2: YES), the controller 100 executes scavenging control. Thus, when the temperature of the internal combustion engine 10 in a case where the engine shutdown is performed is greater than a specified threshold value and it is unlikely for condensation to occur within the crankcase 19, scavenging control is not executed. This limits unnecessary power consumption caused by the driving of the motor 24M of the forced-induction device 24.

Modifications

The present embodiment may be modified as follows. The present embodiment and the following modifications can be combined as long as they remain technically consistent with each other.

Scavenging control may be executed immediately when the internal combustion engine 10 is stopped or may be executed after the internal combustion engine 10 has been stopped. If scavenging control is executed immediately when the internal combustion engine 10 is stopped, operating noise, such as motor driving sound of the forced-induction device 24, might be audible to the vehicle occupants despite the engine being off. Thus, the motor drive noise may cause discomfort to the passengers. To solve this problem, scavenging control may be executed after a specified time has elapsed since the engine shutdown was performed. In this case, scavenging control is executed when the vehicle occupants are likely to have exited and moved away from the vehicle. Therefore, it is possible to mitigate the discomfort experienced by the occupants of the vehicle as described above.

Figure 3:
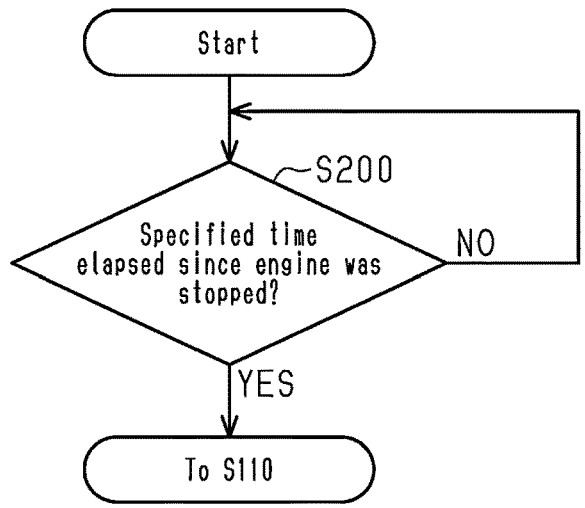
FIG. 3 is a flowchart showing a procedure of processes executed by a controller according to a modification of the embodiment.

FIG. 3 illustrates part of the processing procedure executed by controller 100 to implement this modification. The processes shown in the figure start when the controller 100 determines that the internal combustion engine 10 has stopped operating.

As shown in FIG. 3, the controller 100 executes the process of S200 before performing the process of S110 illustrated in FIG. 2.

In the process of S200, the controller 100 determines whether a specified time has elapsed since the engine was stopped. Examples of the specified time may include parameters such as the time required for the vehicle's occupants to move a certain distance away from the vehicle after the engine has been turned off. Then, the controller 100 repeatedly executes the process of step S200 until it is determined that the specified time has elapsed since the engine was stopped.

In the process of S200, when determining that the specified time has elapsed since the engine was stopped (S200: YES), the controller 100 executes the above-described processes subsequent to S110.

The above-described scavenging control may be executed multiple times, with a specified idle period in between. In this case, scavenging control executed during the initial execution is performed to scavenge within the crankcase 19. In the scavenging control executed after the initial operation, fresh air drawn into the crankcase 19 allows, for example, the drying of condensed water collected on the cylinder bore and the inner walls of the crankcase 19. Scavenging control may be executed any number of times.

Figure 4:
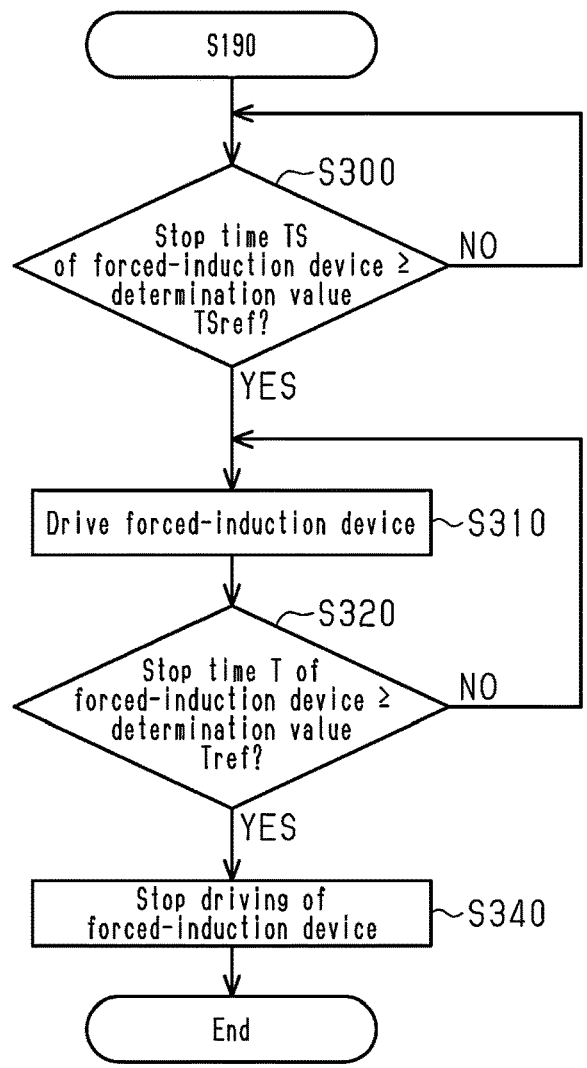
FIG. 4 is a flowchart showing a procedure of processes executed by a controller according to another modification of the embodiment.

FIG. 4 illustrates part of the processing procedure executed by controller 100 to implement this modification. As shown in the figure, the controller 100 executes the processes of S300 to S340 before performing the process of S190 illustrated in FIG. 2.

In the process of S300, the controller 100 determines whether a stop time TS of the forced-induction device 24 is greater than or equal to a specified determination value TSref. The stop time TS is the time elapsed from when the driving of the forced-induction device 24 was stopped in the above-mentioned process S190, and is measured by the controller 100. The determination value TSref is a predetermined value representing the time during which the driving of the forced-induction device 24 is stopped, which is beneficial for drying the interior of the crankcase 19.

Then, until the stop time TS is determined to be greater than or equal to the determination value TSref in the process of S300, the controller 100 repeatedly executes the process of S300.

In the process of step S300, when determining that the stop time TS is greater than or equal to the determination value TSref (S300: YES), the controller 100 drives the forced-induction device 24 by rotating the motor 24M (S310).

Next, the controller 100 determines whether the drive time T of the forced-induction device 24 is greater than or equal to the specified determination value Tref (S320). The drive time T is the time elapsed from the initiation of driving of the forced-induction device 24 in the above-mentioned process S310, and is measured by the controller 100. The determination value Tref is a predetermined value representing the time during which the forced-induction device 24 is driven, which is beneficial for drying the interior of the crankcase 19.

Then, until the drive time T is determined to be greater than or equal to the determination value Tref in the process of S320, the controller 100 repeatedly executes the processes of S310 and S320.

In the process of step S320, when determining that the drive time T is greater than or equal to the determination value Tref (S320: YES), the controller 100 stops the forced-induction device 24 by halting the rotation of the motor 24M (S340). Then, the controller 100 terminates this process.

In the above embodiment, it is determined whether motoring control can be executed based on the intake pressure PIM. The determination of whether motoring control can be executed based on the intake pressure PIM may be omitted. In this case, motoring control may be executed from when the driving of the forced-induction device 24 is started to when it is finished.

Instead of being connected to the surge tank 60, the suction passage 32 may be connected to any section if it is a portion of the intake passage on a downstream side of the flow rate adjusting valve 40.

The internal combustion engine 10 may include only one of the port injection valve 83 and the direct injection valve 84.

The internal combustion engine 10 may include only one of the intake-side variable valve timing mechanism 85 and the exhaust-side variable valve timing mechanism 86.

The PCV passage 35 may include a PCV valve that opens when the pressure in the surge tank 60 becomes lower than the pressure in the separator 31, thereby allowing the blow-by gas to flow from the separator 31 to the surge tank 60.

The internal combustion engine 10 may include an EGR device that recirculates exhaust gases into the intake passage.

LPG, CNG, or other gaseous fuels may be used as the engine fuel for the internal combustion engine 10.

Gasoline, diesel fuel, or liquid fuels such as alcohol fuel may be used as the engine fuel for the internal combustion engine 10.

The vehicle hybrid system is not limited to the one shown in FIG. 1 and may include other hybrid systems.

The number of motor generators included in the vehicle may be changed.

The vehicle may include only the internal combustion engine 10 as a prime mover. In this modification, motoring control can be implemented by driving a starter motor that rotates the crankshaft 18 during engine start-up.

The controller 100 includes the CPU 110 and the memory 120 and executes software processing. However, this is merely an example. For example, the controller 100 may include a dedicated hardware circuit (such as an ASIC) that executes at least part of the software processing executed in the above-described embodiments. Specifically, the controller 100 may have any of the following configurations (a) to (c). (a) A configuration including a processor that executes all of the above processes according to programs and a program storage device such as a memory that stores the programs; (b) A configuration including a processor and a program storage device that execute part of the above-described processes according to the programs and a dedicated hardware circuit that executes the remaining processes. (c) A configuration including a dedicated hardware circuit that executes all of the above processes. A plurality of software circuits each including a processor and a program storage device and a plurality of dedicated hardware circuits may be provided. More specifically, the above-described processes may be executed by processing circuitry that includes at least one of one or more software circuits or one or more dedicated hardware circuits. The program storage devices, or computer-readable media, include any type of media that are accessible by general-purpose computers and dedicated computers.

What is claimed is:

1. A controller for an internal combustion engine, wherein the internal combustion engine includes:
    an intake passage;
    a compressor wheel provided in the intake passage;
    a motor;
    a forced-induction device that drives the compressor wheel using the motor;
    a flow rate adjusting valve provided downstream of the compressor wheel in the intake passage;
    a crankcase;
    a first passage that fluidly connects the crankcase to the intake passage between the compressor wheel and the flow rate adjusting valve; and
    a second passage that fluidly connects the crankcase to a section of the
    intake passage on a downstream side of the flow rate adjusting valve, and the controller comprises processing circuitry configured to execute scavenging control that drives the motor with the flow rate adjusting valve closed in a case where shutdown of the engine is performed.

2. The controller for the internal combustion engine according to claim 1, wherein
    the internal combustion engine further includes:
        a crankshaft;
        an intake port;
        an exhaust port;
        an intake valve that selectively opens and closes the intake port;
        an exhaust valve that selectively opens and closes the exhaust port; and
        an intake pressure sensor configured to detect an intake pressure at a section of the intake passage on a downstream side of the flow rate adjusting valve,
    the internal combustion engine is configured such that valve overlap occurs, in which part of an opening period of the intake valve overlaps part of an opening period of the exhaust valve when the internal combustion engine is not running, and
    the processing circuitry is configured to execute motoring control that rotates the crankshaft of the internal combustion engine when the intake pressure detected during execution of the scavenging control is greater than or equal to a specified determination value.

3. The controller for the internal combustion engine according to claim 1, wherein
    the processing circuitry is configured to execute the scavenging control when a temperature of the internal combustion engine is less than or equal to a specified threshold value at a point in time when the internal combustion engine was stopped.

4. The controller for the internal combustion engine according to claim 1, wherein
    the processing circuitry is configured to execute the scavenging control after a specified time has elapsed since the internal combustion engine was stopped.

5. The controller for the internal combustion engine according to claim 1, wherein
    the processing circuitry is configured to execute the scavenging control multiple times, with a specified idle period in between.

* * * * *